(12) United States Patent
Ueyama et al.

(10) Patent No.: US 10,971,148 B2
(45) Date of Patent: Apr. 6, 2021

(54) INFORMATION PROVIDING DEVICE, INFORMATION PROVIDING METHOD, AND RECORDING MEDIUM FOR PRESENTING WORDS EXTRACTED FROM DIFFERENT WORD GROUPS

(71) Applicant: Honda Motor Co., Ltd., Tokyo (JP)

(72) Inventors: Masaki Ueyama, Saitama (JP); Tomoyuki Sahata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 119 days.

(21) Appl. No.: 16/358,723

(22) Filed: Mar. 20, 2019

(65) Prior Publication Data
US 2019/0304454 A1 Oct. 3, 2019

(30) Foreign Application Priority Data
Mar. 30, 2018 (JP) .............................. JP2018-069466

(51) Int. Cl.
*G10L 15/22* (2006.01)
*G06F 16/35* (2019.01)
(Continued)

(52) U.S. Cl.
CPC ............ *G10L 15/22* (2013.01); *G06F 16/353* (2019.01); *G06F 40/268* (2020.01); *G06F 40/30* (2020.01);
(Continued)

(58) Field of Classification Search
CPC ......... G10L 15/22; G10L 15/26; G10L 17/00; G06F 40/242; G06F 40/247;
(Continued)

(56) References Cited

U.S. PATENT DOCUMENTS 6,754,631 B1 * 6/2004 Din ........................ G10L 15/26
704/270
8,122,086 B1 * 2/2012 King .................... G06Q 10/107
709/206
(Continued)

FOREIGN PATENT DOCUMENTS

JP  2015161892  9/2015

OTHER PUBLICATIONS

White, P. H. "Planning: A joint venture. A training module for school board members", 2004, Available from ProQuest Dissertations and Theses Professional. Retrieved from https://dialog.proquest.com/professional/docview/305046302?accountid=131444 (Year: 2004).*

(Continued)

*Primary Examiner* — Eric Yen
(74) *Attorney, Agent, or Firm* — JCIPRNET (57) ABSTRACT

An information providing device presenting a first and a second word respectively extracted from a first and a second word group includes: a first and a second memory unit respectively storing the first and the second word group; a word extraction unit extracting a word from the second word group as the second word; a sound collection unit collecting a voice signal; and a voice recognition unit performing voice recognition on the collected voice signal, wherein the first memory unit stores a word group of a discussion theme in the first word group; the second memory unit stores a word group corresponding to the first word in the second word group, and the word extraction unit stores a new word in the second word group based on a voice recognition result of content spoken by a speaker at a meeting where the first word and the second word are presented.

8 Claims, 5 Drawing Sheets

(51) Int. Cl.
  *G06F 40/268* (2020.01)
  *G10L 15/26* (2006.01)
  *G10L 17/00* (2013.01)
  *G06F 40/30* (2020.01)
  *H04M 3/56* (2006.01)
  *G10L 15/08* (2006.01)

(52) U.S. Cl.
  CPC .............. *G10L 15/26* (2013.01); *G10L 17/00* (2013.01); *H04M 3/567* (2013.01); *G10L 2015/088* (2013.01)

(58) Field of Classification Search
  CPC ........ G06F 40/268; G06F 40/30; G06F 40/56; G06F 16/353; G06Q 10/10; H04M 3/56; H04M 3/567
  See application file for complete search history.

(56) References Cited

U.S. PATENT DOCUMENTS

| | | | | |
|---|---|---|---|---|
| 8,583,419 | B2* | 11/2013 | Yasin | G06F 40/216 704/9 |
| 9,652,113 | B1* | 5/2017 | Colson | G10L 15/26 |
| 9,953,650 | B1* | 4/2018 | Falevsky | G06F 3/017 |
| 2004/0064322 | A1* | 4/2004 | Georgiopoulos | G10L 15/26 704/277 |
| 2004/0216032 | A1* | 10/2004 | Amitay | G06F 40/169 715/230 |
| 2005/0034079 | A1* | 2/2005 | Gunasekar | G06Q 10/10 715/753 |
| 2005/0131714 | A1* | 6/2005 | Braunstein | G06Q 30/02 709/204 |
| 2005/0149230 | A1* | 7/2005 | Gupta | G06F 40/20 700/246 |
| 2007/0067271 | A1* | 3/2007 | Lu | G06Q 10/10 |
| 2009/0319917 | A1* | 12/2009 | Fuchs | H04M 3/56 715/753 |
| 2010/0114571 | A1* | 5/2010 | Nagatomo | G06F 16/433 704/235 |
| 2010/0169095 | A1* | 7/2010 | Asano | G06F 16/685 704/251 |
| 2011/0012929 | A1* | 1/2011 | Grosz | G06F 40/103 345/661 |
| 2011/0026689 | A1* | 2/2011 | Metz | H04M 3/42221 379/88.14 |
| 2011/0072362 | A1* | 3/2011 | Denner | G06Q 10/109 715/751 |
| 2013/0173254 | A1* | 7/2013 | Alemi | G06F 40/40 704/9 |
| 2013/0268377 | A1* | 10/2013 | Jessup | G06Q 50/01 705/14.73 |
| 2014/0136527 | A1* | 5/2014 | Yoon | G06Q 10/10 707/723 |
| 2014/0222436 | A1* | 8/2014 | Binder | G10L 15/22 704/275 |
| 2014/0298206 | A1* | 10/2014 | Kurosawa | H04L 65/403 715/753 |
| 2015/0193441 | A1* | 7/2015 | Jamrog | G06F 16/24578 707/748 |
| 2015/0294220 | A1* | 10/2015 | Oreif | G06N 5/04 706/12 |
| 2016/0062610 | A1* | 3/2016 | Yuki | G06F 40/279 715/835 |
| 2016/0307571 | A1* | 10/2016 | Mizumoto | H04L 12/1831 |
| 2017/0004419 | A1* | 1/2017 | Kuhlmeier | G06F 3/0482 |
| 2017/0083590 | A1* | 3/2017 | Jagarlamudi | G06F 16/335 |
| 2018/0101823 | A1* | 4/2018 | Nelson | G06Q 10/10 |
| 2018/0253488 | A1* | 9/2018 | Oka | G06Q 50/01 |
| 2018/0341374 | A1* | 11/2018 | Faulkner | H04N 7/152 |
| 2019/0179855 | A1* | 6/2019 | Hu | G06F 40/232 |

OTHER PUBLICATIONS

O. Ramos, "Structure and form: Strengthening selling documents,", 1993, Proceedings Professional Communication Conference The New Face of Technical Communication: People, Processes, Products', pp. 23-27 (Year: 1993).*

* cited by examiner

| Word of first word group | Second word group | | | |
|---|---|---|---|---|
| Ski | Hot spring | Mountaineering | Drive | ... |
| Tennis | Racket | Tennis elbow | Tennis shoes | ... |
| Curling | Stone | Brush | Sweeping | ... |
| .. | ... | ... | ... | ... |

INFORMATION PROVIDING DEVICE, INFORMATION PROVIDING METHOD, AND RECORDING MEDIUM FOR PRESENTING WORDS EXTRACTED FROM DIFFERENT WORD GROUPS

CROSS-REFERENCE TO RELATED APPLICATION

This application claims the priority benefit of Japan Application No. 2018-069466, filed on Mar. 30, 2018. The entirety of the above-mentioned patent application is hereby incorporated by reference herein and made a part of this specification.

BACKGROUND

Technical Field

The disclosure relates to an information providing device, an information providing method, and a recording medium.

Related Art

Inventors have proposed an idea assistance device capable of inspiring a user's idea and leading to a new idea by combining a first word input by the user with a randomly extracted second word and providing the combination to the user in order to bring inspiration to mind (e.g., see Japanese Patent Application No. 2017-157611). Upon bringing inspiration to mind, it is expected that efficient ideas will come out.

In addition, there is known a technique of extracting characteristics relating to a learner's learning based on a result of answers to a test or the like. In a general school's teaching style, a lecturer grasps students' degree of comprehension and so on by a desk patrol around the students. However, in this form, the number of students that one lecturer can check at a time is limited, and it is difficult to accurately and promptly grasp each student's degree of comprehension and so on. Hence, it has been proposed (e.g., see Japanese Laid-open No. 2015-161892 (Patent Document 1)) that in the case where a student has entered an answer to a question in an answer column with an electronic pen system, an analyzer determines the degree of comprehension of the student who entered the answer or a degree of difficulty of the question based on entry information showing the student's handwriting. In the technique described in Patent Document 1, a track from a pen-down in which an electronic pen contacts the answer column until a pen-up in which the electronic pen leaves the answer column is detected as stroke information. In the technique described in Patent Document 1, based on this stroke information, number of strokes per question, answer time, stroke length, area of an entry area within an answer sheet, writing pressure, distance between strokes, direction of entry, distribution of strokes and so on are recognized. Furthermore, in the technique described in Patent Document 1, based on the recognized information, the student's state, such as whether the student is concentrating, stumbling, inspired, or whether group work is going well, is detected. Moreover, in the technique described in Patent Document 1, in the case where a rate of increase in the number of strokes per unit time exceeds a predetermined value, it is determined that the student has an inspiration.

However, with the technique described in Patent Document 1, it is only detecting whether there was an inspiration based on the stroke of the electronic pen, and it is impossible to assist in creating user's inspiration.

The disclosure provides an information providing device, an information providing method, and a program, capable of assisting in creating user's inspiration and improving efficiency in creating inspiration.

SUMMARY (1) An information providing device (1) according to an aspect of the disclosure is an information providing device presenting a first word extracted from a first word group and a second word extracted from a second word group. The information providing device includes: a first memory unit (101) storing the first word group; a second memory unit (103) storing the second word group; a word extraction unit (second word extraction unit 104) extracting a word from the second word group as the second word; a sound collection unit (22) collecting a voice signal; and a voice recognition unit (109) performing voice recognition on the collected voice signal, wherein the first memory unit stores a word group of a discussion theme in the first word group; the second memory unit stores a word group corresponding to the first word in the second word group; and the word extraction unit stores a new word in the second word group based on a result of voice recognition of content spoken by a speaker at a meeting at which the first word and the second word are presented.

(2) An information providing method according to an aspect of the disclosure is an information providing method in an information providing device. The information providing device has a first memory unit storing a first word group composed of at least one first word, a second memory unit storing a second word group, a sound collection unit, and a voice recognition unit recognizing a collected voice signal, wherein the first memory unit stores a word group of a discussion theme in the first word group, the second memory unit stores a word group corresponding to the first word in the second word group, and the information providing device presents the first word extracted from the first word group and a second word extracted from the second word group. The information providing method includes the following steps. A first word extracting step is included in which a first word extraction unit extracts the first word from the first word group. A second word extracting step is included in which a second word extraction unit extracts the second word corresponding to the extracted first word from the second word group. A step is included of storing a new word in the second word group based on a result of voice recognition of content spoken by a speaker at a meeting at which the first word and the second word are presented.

(3) A non-transitory recording medium according to an aspect of the disclosure stores a program for a computer of an information providing device. The information providing device has a first memory unit storing a first word group composed of at least one first word, a second memory unit storing a second word group, a sound collection unit, and a voice recognition unit recognizing a collected voice signal, wherein the first memory unit stores a word group of a discussion theme in the first word group, the second memory unit stores a word group corresponding to the first word in the second word group, and the information providing device presents the first word extracted from the first word group and a second word extracted from the second word group. The program causes the computer to execute the following steps. A first word extracting step is executed of extracting the first word from the first word group. A second word extracting step is executed of extracting the second word corresponding to the extracted first word from the second word group. A new word is stored in the second word group based on a result of voice recognition of content spoken by a speaker at a meeting at which the first word and the second word are presented.

DESCRIPTION OF THE EMBODIMENTS (4) In the information providing device according to an aspect of the disclosure, the word extraction unit may store a word derived by the presentation of the first word and the second word in the second word group.

(5) In the information providing device according to an aspect of the disclosure, the word extraction unit may store a word used in a process of deriving the derived word in the second word group.

(6) In the information providing device according to an aspect of the disclosure, the word extraction unit extracts by data mining, from a minutes of the meeting at which the first word and the second word are presented, a word reached as a conclusion of the meeting, and stores the extracted word in the second word group.

(7) In the information providing device according to an aspect of the disclosure, the second memory unit may classify each word in the second word group into a level and store the word, and the word extraction unit may provide a word with a low level as the second word.

According to the configuration of the above (1), (2) or (3), since the word reached as the conclusion of the meeting can be extracted by performing voice recognition of the speaker's utterance, it is possible to assist in creating user's inspiration and improve efficiency in creating inspiration.

According to the configuration of the above (4), by storing the word reached as the conclusion of the meeting as the new word in the second word group, the stored new word can be used for the second word at the next meeting. Accordingly, it is possible to revitalize the creation of user's inspiration.

According to the configuration of the above (5), by storing the word used in the process of deriving the word reached as the conclusion of the meeting as the new word in the second word group, the stored new word can be used for the second word at the next meeting. Accordingly, it is possible to revitalize the creation of user's inspiration.

According to the configuration of the above (6), it is easier for the user to bring even more new words to mind.

According to the configuration of the above (7), by presenting the second word with a low use frequency, an idea unexpected by the user can be obtained.

Hereinafter, an embodiment of the disclosure is explained with reference to the drawings.

Figure 1:
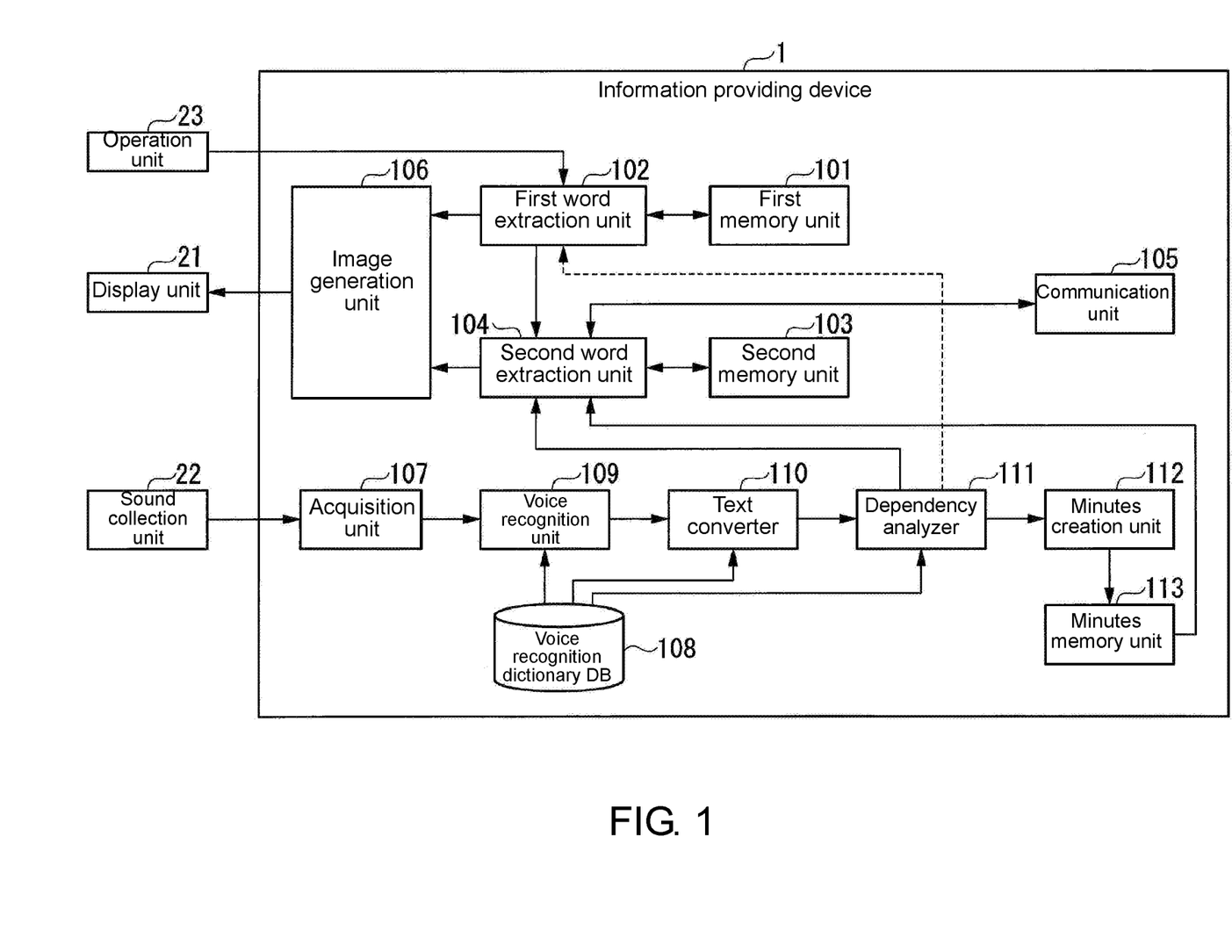
FIG. 1 illustrates a configuration example of an information providing device according to the present embodiment.

FIG. 1 illustrates a configuration example of an information providing device 1 according to the present embodiment. As shown in FIG. 1, the information providing device 1 includes a first memory unit 101, a first word extraction unit 102, a second memory unit 103, a second word extraction unit 104 (word extraction unit), a communication unit 105, an image generation unit 106, an acquisition unit 107, a voice recognition dictionary database (DB) 108, a voice recognition unit 109, a text converter 110, a dependency analyzer 111, a minutes creation unit 112, and a minutes memory unit 113. A display unit 21, a sound collection unit 22, and an operation unit 23 are connected to the information providing device 1.

The display unit 21 is a liquid crystal display device, an organic electroluminescence (EL) display device, an electronic ink display device, or the like. The display unit 21 displays an image output by the image generation unit 106.

The sound collection unit 22 is a microphone. The sound collection unit 22 collects a voice signal and outputs the collected voice signal to the acquisition unit 107. In the case where there are a plurality of participants in a meeting, the sound collection unit 22 is used for each user.

The operation unit 23 is a keyboard, a mouse, a tablet, a touch panel sensor, or the like. The operation unit 23 detects an operation result of the user's operation, and outputs the detected operation result to the first word extraction unit 102. The operation unit 23 may be connected to the information providing device 1 via a wireless network. In this case, the operation unit 23 may be a tablet terminal, a smartphone or the like.

The first memory unit 101 stores a first word group composed of a plurality of words. The plurality of words stored in the first memory unit 101 are, for example, discussion themes.

The first word extraction unit 102 acquires a plurality of words based on the detection result output by the operation unit 23, and stores the acquired words in the first memory unit 101. The first word extraction unit 102 may perform voice recognition of an uttered voice signal so as to acquire a plurality of words. In this case, the first word extraction unit 102 acquires a plurality of pieces of text information output by the dependency analyzer 111, and stores the acquired plurality of pieces of text information as the first word group in the first memory unit 101. The first word extraction unit 102 extracts one word from the first word group stored in the first memory unit 101, and outputs the extracted word as a first word to the second word extraction unit 104 and the image generation unit 106.

The second memory unit 103 stores a second word group composed of a plurality of words. In the case where there are a plurality of words stored in the first word group, the second memory unit 103 stores the second word group for each word stored in the first word group. Specifically, the second memory unit 103 stores the second word group (1) corresponding to a word (1) for the word (1). The second memory unit 103 stores the second word group (2) corresponding to a word (2) for the word (2). In addition, minutes information includes information indicating date and time when a discussion is made, a presented first word, and a presented second word. The minutes information may also include information (name or identification information) indicating participants who participate in the discussion.

The second word extraction unit 104 extracts one word from the second word group stored in the second memory unit 103, and outputs the extracted word as the second word to the image generation unit 106.

In addition, the second word extraction unit 104 acquires the first word output by the first word extraction unit 102. The second word extraction unit 104 searches and acquires a plurality of words corresponding to the acquired first word from, for example, the Internet, via the communication unit 105, and stores the acquired words in the second memory unit 103. For example, the second word extraction unit 104 searches for the first word using a search engine on the Internet and acquires a word. Alternatively, the second word extraction unit 104 acquires a plurality of pieces of text information output by the dependency analyzer 111, and stores the acquired plurality of pieces of text information as a plurality of words in the second memory unit 103. The plurality of words acquired by voice recognition are a plurality of words corresponding to the words stored in the first word group. In this way, the second word extraction unit 104 stores, in advance, the plurality of words corresponding to the words stored in the first word group as the second word group in the second memory unit 103.

Furthermore, the second word extraction unit 104 reads, from the minutes memory unit 113, a minutes of a meeting held by presenting the first word and the second word. The second word extraction unit 104 extracts a conclusion of the meeting as the second word, and stores the extracted second word as one of the second word group in the second memory unit 103.

The communication unit 105 is a wireless communication unit or a wired communication unit. The communication unit 105 connects to a network according to an instruction from the second word extraction unit 104. The communication unit 105 acquires the searched word and outputs the acquired word to the second word extraction unit 104.

The image generation unit 106 generates the first word output by the first word extraction unit 102 and the second word output by the second word extraction unit 104 as one image and outputs it to the display unit 21. The image output to the display unit 21 includes a text image of the first word and a text image of the second word.

The acquisition unit 107 acquires the voice signal output by the sound collection unit 22. The acquisition unit 107 converts an acquired analog voice signal into a digital signal and outputs the converted voice signal to the voice recognition unit 109.

The voice recognition dictionary database 108 is a database in which, for example, an acoustic model, a language model, a word dictionary and so on are stored. The acoustic model refers to a model based on a feature quantity of a sound; the language model refers to a model of information of words and their arrangement. In addition, the word dictionary refers to a dictionary based on a large amount of vocabulary, and is, for example, a large vocabulary word dictionary.

The voice recognition unit 109 acquires the voice signal output by the acquisition unit 107. The voice recognition unit 109 detects a voice signal of an utterance section from the voice signal output by the acquisition unit 107. For detection of the utterance section, for example, a voice signal having a predetermined threshold value or greater is detected as the utterance section. Moreover, the voice recognition unit 109 may detect the utterance section using other well-known methods. The voice recognition unit 109 performs voice recognition on the detected voice signal of the utterance section using a well-known method with reference to the voice recognition dictionary database 108. The voice recognition unit 109 performs voice recognition using, for example, a method disclosed in Japanese Laid-open No. 2015-64554, or the like. The voice recognition unit 109 outputs a recognized recognition result to the text converter 110. Moreover, the voice recognition unit 109 outputs the recognition result and the voice signal, for example, for each sentence or for each utterance section.

The text converter 110 converts the recognition result output by the voice recognition unit 109 into text with reference to the voice recognition dictionary database 108. The text converter 110 outputs the converted text information to the dependency analyzer 111. The text converter 110 may delete interjections such as "ah," "uh," "huh," "well" and so on and then convert the recognition result into text.

The dependency analyzer 111 carries out morphological analysis and dependency analysis on the text information output by the text converter 110 with reference to the voice recognition dictionary database 108. For the dependency analysis, for example, support vector machines (SVMs) are used in a shift-reduce method, or a spanning tree method, or a stepwise application method of chunk identification. The dependency analyzer 111 outputs the text information output by the text converter 110 and a result of the dependency analysis to the minutes creation unit 112.

In addition, the dependency analyzer 111 removes interjections and so on based on the result of the dependency analysis and then extracts words. When storing the first word group in the first memory unit 101, the dependency analyzer 111 outputs the extracted words to the first word extraction unit 102. When storing the second word group in the second memory unit 103, the dependency analyzer 111 outputs the extracted words to the second word extraction unit 104.

The minutes creation unit 112 creates a minutes based on the text information output by the dependency analyzer 111 and stores minutes information of the created minutes in the minutes memory unit 113. The minutes creation unit 112 may store a voice signal related to the minutes information of the created minutes in the minutes memory unit 113. The minutes creation unit 112 may delete the interjections such as "ah," "uh," "huh," "well" and so on, so as to create the minutes.

The minutes memory unit 113 stores the minutes information of the minutes created by the minutes creation unit 112. Moreover, the minutes memory unit 113 may also store the voice signal of the meeting in association with the minutes information.

In the case where there are a plurality of participants in the meeting, the information providing device 1 may include, for example, the acquisition unit 107 for each sound collection unit 22. Alternatively, the acquisition unit 107 may acquire the voice signal output by each sound collection unit 22 by time division processing. In addition, the information providing device 1 performs voice recognition processing on a plurality of acquired voice signals for each sound collection unit 22, i.e., for each speaker.

Figure 2:
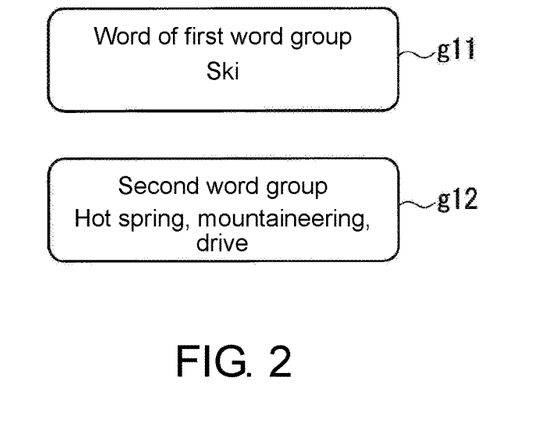
FIG. 2 illustrates an example of a word of a first word group and a second word group according to the present embodiment.

Next, an example of the word of the first word group and the second word group is explained.

FIG. 2 illustrates an example of the word of the first word group and the second word group according to the present embodiment. The sign g11 indicates an example of the word of the first word group. The sign g12 indicates an example of the second word group.

The word of the first word group is a word (set word) set by the user. In the example shown in FIG. 2, the word of the first word group is "ski." The word of the first word group is a word extracted from the first word group set by the user by inputting by operating the operation unit 23 or by performing voice recognition on the user's utterance. When the information providing device 1 is used, at least one word is stored as the first word group in the first memory unit 101. In the case where the first word group is one word, the user may utter and input one word as the first word or may operate the operation unit 23 to set the first word. In this case, the first word extraction unit 102 may set the first word based on a result of voice recognition or a result of operation of the operation unit 23, without extracting words from the first memory unit 101.

The second word group corresponds to the first word. In the example shown in FIG. 2, the second word group is "hot spring, mountaineering, drive." The second word is set, for example, by performing voice recognition on the user's utterance. After at least one second word group is stored in the second memory unit 103, use of the information providing device 1 is started.

Next, an example of a procedure for using the information providing device 1 is explained.
(i) Step 1: The information providing device 1 stores at least one first word in the first memory unit 101 based on the result obtained by the user operating the operation unit 23.
(ii) Step 2: The information providing device 1 performs voice recognition on the user's utterance, and stores at least one second word group in the second memory unit 103.
(iii) Step 3: The information providing device 1 extracts one word (first word) from the first word group stored in the first memory unit 101. The information providing device 1 extracts one word (second word) corresponding to the first word from the second word group stored in the second memory unit 103. The information providing device 1 displays the first word and the second word on the display unit 21.
(iv) Step 4: The user looks at the first word and the second word presented by the information providing device 1, and utters a word or the like that comes to mind. Moreover, there may be one user or a plurality of users. The information providing device 1 performs voice recognition processing and so on on the user's utterance and creates a minutes.
(v) Step 5: The information providing device 1 extracts a word derived as a conclusion from the minutes. The information providing device 1 stores the extracted word as the second word in second memory unit 103.

Figure 3:
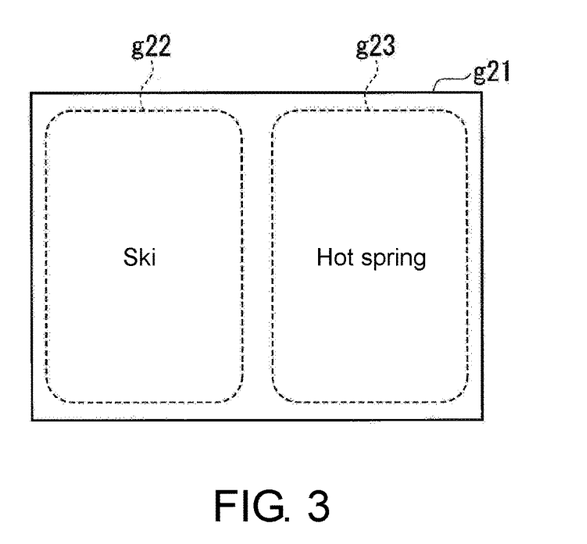
FIG. 3 illustrates an example of a first word and a second word presented on a display unit of the information providing device according to the present embodiment.

FIG. 3 illustrates an example of the first word and the second word presented on the display unit 21 of the information providing device 1 according to the present embodiment. The sign g21 indicates an image displayed on the display unit 21. The sign g22 indicates an image of the first word. The sign g23 indicates an image of the second word. The display on the display unit 21 is an example and the disclosure is not limited thereto. For example, in the case where the first word is a discussion theme, the information providing device 1 may further display an image of the characters "discussion theme" in the image of the sign g22.

In the example shown in FIG. 3, the information providing device 1 extracts or sets "ski" as the first word, extracts "hot spring" as the second word corresponding to the first word, and presents the first word and the second word.

The presentation example of the first word and the second word shown in FIG. 3 is an example and the disclosure is not limited thereto. The information providing device 1 may present the first word and the second word by arranging them vertically side by side, or may present them together with colors corresponding to each word as described in Japanese Patent Application No. 2017-157611, or may present each word by animation as described in Japanese Patent Application No. 2017-157611.

The user looks at the two words "ski" and "hot spring" presented in this way and utters a word that comes to mind from these two words. It is assumed that the words that the user is about to utter include, for example, "Zao," "party," "night game" and so on. Then, the user selects a conclusion word (derived word) from these uttered words. Assuming that the conclusion word is, for example, "Zao," in this case, the information providing device 1 extracts "Zao" as the conclusion word from a minutes of a discussion about ski, and stores the extracted word "Zao" as the second word in the second memory unit 103. A conclusion may be determined as follows. In the case where a predetermined phrase, for example, is uttered in the discussion process, it is determined that the conclusion is reached. The predetermined phrase refers to, for example, "that's right" or "that's it!" These phrases are stored in the voice recognition dictionary database 108.

The information providing device 1 may weight the new second word obtained when the first word and second word are presented in this way and store it in the second memory unit 103. Moreover, the conclusion word may not only be a word recognized by voice recognition but may also be a word obtained by text input.

Figure 4:
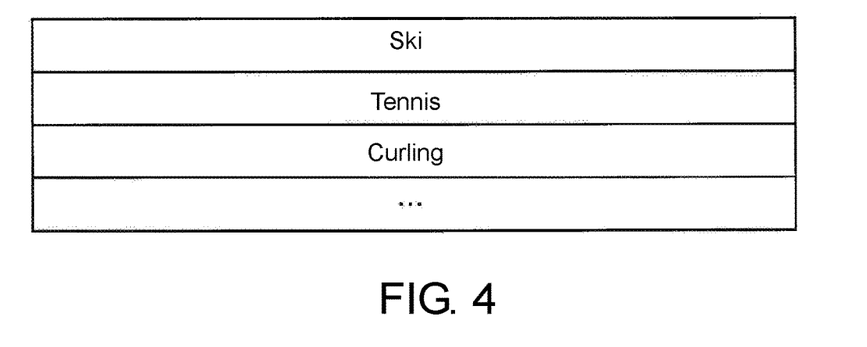
FIG. 4 illustrates an example of the first word group stored in a first memory unit according to the present embodiment.

Next, an example of the first word group stored in the first memory unit 101 is explained.

FIG. 4 illustrates an example of the first word group stored in the first memory unit 101 according to the present embodiment. As shown in FIG. 4, the first memory unit 101 stores a plurality of words as the first word group. In the example shown in FIG. 4, the words stored in the first memory unit 101 include "ski," "tennis," "curling" and so on. The first word group is "ski, tennis, curling, etc."

Figure 5:
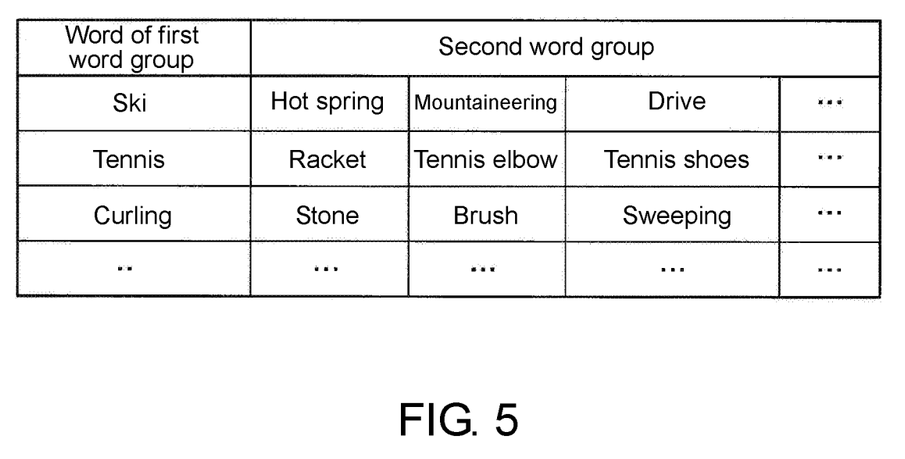
FIG. 5 illustrates an example of the second word group stored in a second memory unit according to the present embodiment.

Next, an example of the second word group stored in the second memory unit 103 is explained.

FIG. 5 illustrates an example of the second word group stored in the second memory unit 103 according to the present embodiment. As shown in FIG. 5, the second memory unit 103 stores a plurality of words as the second word group. In addition, the second memory unit 103 stores the second word group in association with the words stored in the first memory unit 101. In the example shown in FIG. 5, the words stored in the second memory unit 103 that are associated with the word "ski" stored in the first memory unit 101 include "hot spring," "mountaineering," "drive" and so on. In addition, the second word group is "hot spring, mountaineering, drive, etc." The words stored in the second memory unit 103 that are associated with the word "curling" stored in the first memory unit 101 include "stone," "brush," "sweeping" and so on. In addition, the second word group is "stone, brush, sweeping, etc."

For example, in the case where "sweeping" is selected as a new word when the first word "curling" and the second word "stone" are presented, the second word extraction unit 104 associates "sweeping" with the first word "curling" and adds the word to the second word group. In this case, the second word extraction unit 104 may add a weight of, for example, 1.5, to the selected word "sweeping" and then store it.

Figure 6:
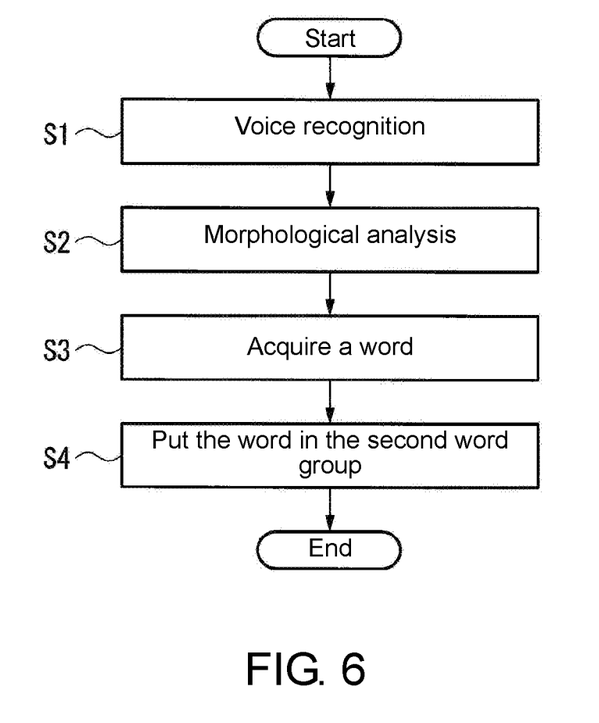
FIG. 6 is a flowchart showing an example of a processing procedure for registering the second word group in the second memory unit according to the present embodiment.

Next, an example of a processing procedure for registering the second word group in the second memory unit 103 is explained.

FIG. 6 is a flowchart showing an example of a processing procedure for registering the second word group in the second memory unit 103 according to the present embodiment.

(Step S1) The voice recognition unit 109 performs voice recognition processing on a voice signal collected by the sound collection unit 22 and acquired by the acquisition unit 107, using the voice recognition dictionary database 108. Subsequently, the text converter 110 converts a recognition result output by the voice recognition unit 109 into text with reference to the voice recognition dictionary database 108.

(Step S2) The dependency analyzer 111 carries out morphological analysis and dependency analysis (also called morphological analysis) on text information output by the text converter 110.

(Step S3) The second word extraction unit 104 acquires a word (noun) from the utterance.

(Step S4) The second word extraction unit 104 puts the acquired word in the second word group and stores the acquired word in the second memory unit 103.

In the example shown in FIG. 6, an example has been explained in which the second word group is registered in the second memory unit 103 by utterance. However, the registration may also be performed based on a result obtained by the user operating the operation unit 23.

Figure 7:
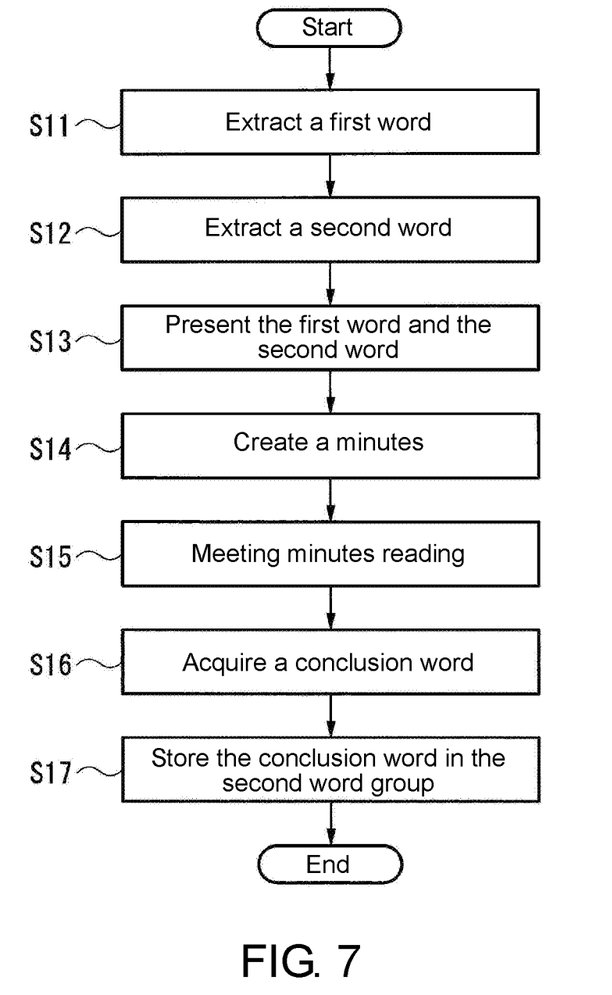
FIG. 7 is a flowchart showing an example of a procedure for extracting a word derived from a minutes created when the first word and the second word are presented according to the present embodiment.

Next, an example of a procedure for extracting a word derived from a minutes created when the first word and the second word are presented is explained.

FIG. 7 is a flowchart showing an example of the procedure for extracting a word derived from the minutes created when the first word and the second word are presented according to the present embodiment.

(Step S11) The first word extraction unit 102 extracts one word as the first word from the first word group stored in the first memory unit 101.

(Step S12) The second word extraction unit 104 extracts one word corresponding to the first word as the second word from the second word group stored in the second memory unit 103.

(Step S13) The information providing device 1 presents the first word and the second word.

(Step S14) The user looks at the presented first word and second word and utters a word that comes to mind. The information providing device 1 performs voice recognition, text conversion and dependency analysis on an uttered voice, creates a minutes and stores it in the minutes memory unit 113. Moreover, the information providing device 1 may perform the above processing on the voice signal acquired by the acquisition unit 107 on line or offline.

(Step S15) The second word extraction unit 104 reads minutes information stored in the minutes memory unit 113. In the case where a plurality of pieces of minutes information are stored in the minutes memory unit 113, the information providing device 1 displays, on the display unit 21, information (creation date and time, and the presented first word and second word) relating to the stored plurality of pieces of minutes information in a form of, for example, a list. The user may look at the displayed list and select a minutes from which the derived word is intended to be extracted by operating the operation unit or by utterance. In this case, the information providing device 1 recognizes a selection result by performing voice recognition or the like on the utterance. The information providing device 1 may read the minutes information selected in this way.

(Step S16) The second word extraction unit 104 selects a conclusion word (derived word) from the read minutes information. A conclusion may be determined as follows. In the case where a predetermined phrase, for example, is uttered in a discussion process, it is determined that the conclusion is reached.

(Step S17) The second word extraction unit 104 acquires the first word included in the minutes information. The second word extraction unit 104 associates the selected conclusion word with the acquired first word, puts it in the second word group and stores it in the second memory unit 103.

The conclusion word to be acquired includes at least one word, or may include two or more words. In addition, the second word extraction unit 104 may add a word used in the derivation process to the second word group. In this way, by also adding the word used in the derivation process to the second word group, even more new words can be easily brought to mind by using this new word at the next meeting.

As described above, in the present embodiment, a word group of a discussion theme is stored in the first word group, and the second word group corresponding to the words of the first word group is stored in the second word group. In addition, in the present embodiment, a word newly derived based on the content spoken by a speaker at a meeting when one first word selected from the first word group and one second word selected from the second word group that corresponds to the first word are presented may be stored in the second word group. Alternatively, in the present embodiment, a word newly derived based on the content spoken by the speaker at the meeting when a set first word and one second word corresponding to the first word and selected from the second word group are presented may be stored in the second word group.

Accordingly, according to the present embodiment, based on two presented words, the user can discuss a new word, and a word derived from the discussion can be stored as the new word in the second word group. According to the present embodiment, after this new word is derived, since a discussion can be made using the derived word and the corresponding first word, efficiency in creating inspiration can be improved.

Also, by storing the word derived as the conclusion of the meeting as the new word in the second word group, the stored new word can be used for the second word at the next meeting. Accordingly, it is possible to revitalize the creation of user's inspiration.

First Modification

In the above example, an example has been explained in which the second memory unit 103 stores a plurality of words as the second word group. However, the disclosure is not limited thereto. The plurality of words may be assigned levels and then stored.

Figure 8:
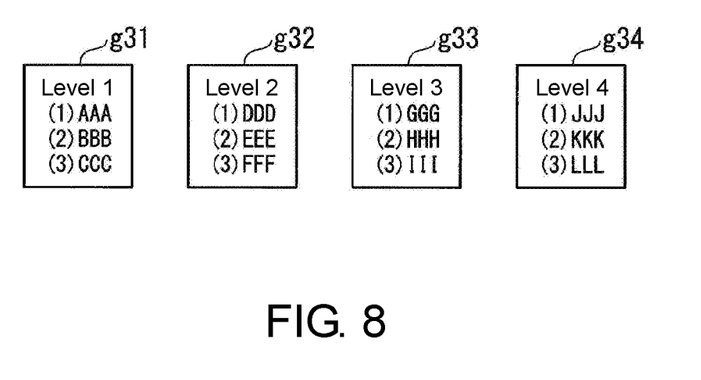
FIG. 8 illustrates an example of information stored in the second memory unit in a first modification.

FIG. 8 illustrates an example of information stored in the second memory unit 103 in a first modification. In the example shown in FIG. 8, the second word group corresponding to the words of the first word group includes AAA, BBB, CCC, DDD, EEE, FFF, GGG, HHH, III, JJJ, KKK, and LLL. In the example shown in FIG. 8, level 1 is the highest level, level 2 is lower than level 1 and higher than level 3, level 3 is higher than level 4, and level 4 is the lowest level. Moreover, a higher level corresponds to a larger number of times (also referred to as number of instructions) a word is extracted by the second word extraction unit 104 from the second word group. A lower level corresponds to a smaller number of times a word is extracted by the second word extraction unit 104 from the second word group.

As indicated by the sign g31, the words AAA, BBB and CCC are assigned level 1. As indicated by the sign g32, the words DDD, EEE and FFF are assigned level 2. As indicated by the sign g33, the words GGG, HHH and III are assigned level 3. As indicated by the sign g34, the words JJJ, KKK and LLL are assigned level 4.

In the above-described embodiment, when the first word and the second word are presented to the user, the second word extraction unit 104, for example, randomly extracts one word as the second word from the second word group stored in the second memory unit 103.

In this case, the second word extraction unit 104 randomly extracts one word from the second word group (AAA, BBB, CCC, DDD, EEE, FFF, GGG, HHH, III, JJJ, KKK, and LLL).

On the other hand, in the first modification, when the first word and the second word are presented to the user, the second word extraction unit 104 extracts one word from the group with the lowest level from the second word group stored in the second memory unit 103.

In the first modification, the second word extraction unit 104 randomly extracts one word from, for example, the group of words (JJJ, KKK, LLL) with level 4.

Herein, if a word with a large number of presentations is presented, it may be impossible to obtain an idea unexpected by the user. According to the first modification, by presenting the second word with a low use frequency, an idea unexpected by the user can be obtained.

Second Modification

In a second modification, when words are acquired from a minutes of a meeting or a discussion, a word is selected by data mining.

Figure 9:
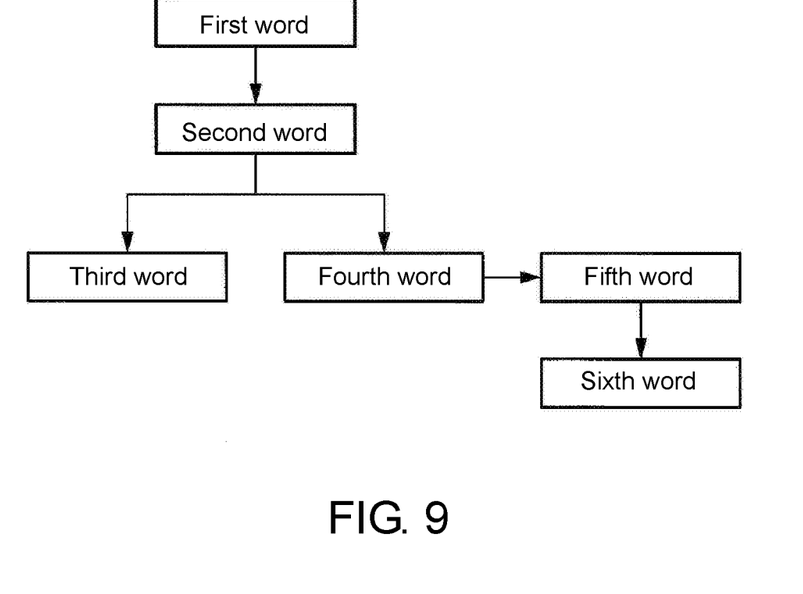
FIG. 9 illustrates an example in which a pattern of minutes information is extracted by a data mining method in a second modification.

FIG. 9 illustrates an example in which a pattern of minutes information is extracted by a data mining method in the second modification.

By reading the minutes information stored in the minutes memory unit 113 and analyzing correlations, rules and so on of the uttered words with respect to the read minutes information by the data mining method, the second word extraction unit 104 analyzes a pattern of the uttered words. The method used is, for example, knowledge discovery (search) data mining, or hypothesis verification (purpose-oriented) data mining. The pattern analyzed in this way is the pattern in FIG. 9. In FIG. 9, it is assumed that "sixth word," for example, is the conclusion word. The second word extraction unit 104 stores a model used for data mining analysis.

The user utters a word that they thought of freely. Then, the second word extraction unit 104 selects a word from the minutes information by a data mining method. Accordingly, according to the second modification, it is easier for the user to bring even more new words to mind.

Also, in this case, the second word extraction unit 104 is capable of adding an estimated word to the second word group and storing the estimated word in the second memory unit 103. As in the first modification, the information providing device 1 may classify the estimated word into a level and store it. In addition, the number of the conclusion word to be estimated by the second word extraction unit 104 is not limited to one, and may be two or more. For example, in FIG. 9, in the case where a correlation between the "sixth word" and the "fifth word" is strong and the "sixth word" is detected as a derivation of the "fifth word," the second word extraction unit 104 may add both the "sixth word" and the "fifth word" to the second word group and store them in the second memory unit 103.

In this way, the second word extraction unit 104 may add a word used in the derivation process to the second word group. In this way, by adding the word used in the derivation process to the second word group, even more new words can be easily brought to mind by using this new word at the next meeting.

Moreover, FIG. 9 is a diagram for explaining the second modification, and a pattern obtained by analyzing the minutes information is not limited thereto.

A program for realizing all or part of the functions of the information providing device 1 in the disclosure may be recorded on a computer-readable recording medium, and all or part of the processing performed by the information providing device 1 may be performed by having a computer system read and execute the program recorded on the recording medium. The "computer system" mentioned here includes an OS or hardware such as peripheral devices. In addition, the "computer system" also includes a WWW system having a homepage providing environment (or display environment). The "computer-readable recording medium" refers to a memory device, such as a portable medium such as a flexible disk, a magneto-optical disk, a ROM and a CD-ROM, or a hard disk built in the computer system, and so on. Furthermore, the "computer-readable recording medium" also includes those holding a program for a fixed time, such as a volatile memory (RAM) in the computer system serving as a server or a client in the case where the program is transmitted via a network such as the Internet or a communication line such as a telephone line.

The above program may be transmitted from a computer system in which the program is stored in the memory device or the like to another computer system via a transmission medium or by a transmission wave in the transmission medium. Herein, the "transmission medium" that transmits the program refers to a medium having a function of transmitting information, like a network (communication network) such as the Internet or a communication line such as a telephone line. The above program may be for realizing part of the aforementioned functions. Furthermore, the above program may be a so-called differential file (differential program) capable of realizing the aforementioned functions by combination with a program already recorded in the computer system.

What is claimed is:

1. An information providing device presenting a first word extracted from a first word group and a second word extracted from a second word group, the information providing device comprising a computer system configured to:
   store the first word group;
   store the second word group;
   extract a word from the second word group as the second word;
   collect a voice signal;
   perform voice recognition on the collected voice signal;
   store a word group of a discussion theme in the first word group;
   store a word group corresponding to the first word in the second word group;
   store a new word in the second word group based on a result of voice recognition of content spoken by a speaker at a meeting at which the first word and the second word are presented;

extract a word of an utterance of the speaker reached as a conclusion of the meeting from minutes of the meeting at which the first word and the second word are presented using data mining; and store the extracted word reached as the conclusion of the meeting in the second word group.

2. The information providing device according to claim 1, wherein the computer system is further configured to store each word in the second word group by level, and provide a word with a low level as the second word.

3. The information providing device according to claim 1, wherein the computer system is further configured to store a word derived by the presentation of the first word and the second word at the meeting in the second word group.

4. The information providing device according to claim 3, wherein the computer system is further configured to store each word in the second word group by level, and provide a word with a low level as the second word.

5. The information providing device according to claim 3, wherein the computer system is further configured to store a word used in a process of deriving the derived word in the second word group.

6. The information providing device according to claim 5, wherein the computer system is further configured to store each word in the second word group by level, and provide a word with a low level as the second word.

7. An information providing method in an information providing device, the information providing device having a computer system configured to store a first word group, store a second word group, recognize a collected voice signal, store a word group of a discussion theme in the first word group, store a word group corresponding to a first word extracted from the first word group in the second word group, and present the first word extracted from the first word group and a second word extracted from the second word group, wherein the information providing method comprises:

extracting the first word from the first word group;

extracting a word corresponding to the extracted first word as the second word from the second word group; and storing a new word in the second word group based on a result of voice recognition of content spoken by a speaker at a meeting at which the first word and the second word are presented, extracting a word of an utterance of the speaker reached as a conclusion of the meeting from minutes of the meeting at which the first word and the second word are presented using data mining, and storing the extracted word reached as the conclusion of the meeting in the second word group.

8. A non-transitory recording medium storing a program for a computer system of an information providing device, the computer system being configured to store a first word group, store a second word group, recognize a collected voice signal, store a word group of a discussion theme in the first word group, store a word group corresponding to a first word extracted from the first word group in the second word group, and present the first word extracted from the first word group and a second word extracted from the second word group, wherein the program, when executed by the computer system, causes the computer system to execute:

extracting the first word from the first word group;

extracting a word corresponding to the extracted first word as the second word from the second word group; and storing a new word in the second word group based on a result of voice recognition of content spoken by a speaker at a meeting at which the first word and the second word are presented, extracting a word of an utterance of the speaker reached as a conclusion of the meeting from minutes of the meeting at which the first word and the second word are presented using data mining, and storing the extracted word reached as the conclusion of the meeting in the second word group.

* * * * *